United States Patent [19]

Miyakoshi et al.

[11] 4,401,316
[45] Aug. 30, 1983

[54] FRONT SUSPENSION FOR MOTOCYCLE

[75] Inventors: Shinichi Miyakoshi, Fujimi; Tokio Isono, Tokyo, both of Japan

[73] Assignee: Honda Giken Kogyo Kabushiki Kaisha, Tokyo, Japan

[21] Appl. No.: 243,054

[22] Filed: Mar. 12, 1981

[30] Foreign Application Priority Data

Mar. 17, 1980 [JP] Japan .................................. 55-33752
Mar. 17, 1980 [JP] Japan .................................. 55-33753
Mar. 19, 1980 [JP] Japan .................................. 55-35665

[51] Int. Cl.$^3$ ............................................. B62K 25/04
[52] U.S. Cl. .................................... 280/277; 180/229; 280/279; D12/110
[58] Field of Search ............... 280/277, 274, 275, 276, 280/277, 278, 279, 280, 281 R, 283; 180/229; D12/110

[56] References Cited

U.S. PATENT DOCUMENTS 4,212,481 7/1980 Ribi .................................. 280/279 X

FOREIGN PATENT DOCUMENTS 30306 6/1981 European Pat. Off. ............ 280/277
32170 7/1981 European Pat. Off. ............ 280/277
2418742 2/1979 France ................................. 280/277
223638 10/1924 United Kingdom ................ 280/276

*Primary Examiner*—David M. Mitchell
*Assistant Examiner*—Mitchell J. Hill
*Attorney, Agent, or Firm*—Irving M. Weiner; Pamela S. Burt; John L. Shortley

[57] ABSTRACT

A front wheel suspension for a motorcycle including at least one first linkage in the form of a four-bar linkage having an upper fork assembly pivoted to the vehicle frame and a lower fork assembly supporting the front wheel, the upper fork assembly and the lower fork assembly being connected with each other through front and rear arms which are both pivotable, and at least one shock absorber, wherein at least one second linkage is interposed between the first linkage and the shock absorber, the second linkage having an input part pivotably connected to the first linkage and an output part pivotably connected to one of the ends of the shock absorber, the output part being movable by a progressive displacement additional to a displacement of the input part with respect to a direction substantially effective for the shock absorber to exhibit the function thereof.

The shock absorber is operated at a larger increasing rate of the stroke thereof, the road irregularity following performance is further improved, the center of gravity of the motorcycle can be lowered by lowering the driver's seat, and the diving of the front wheel unit while braking can be reduced.

14 Claims, 15 Drawing Figures

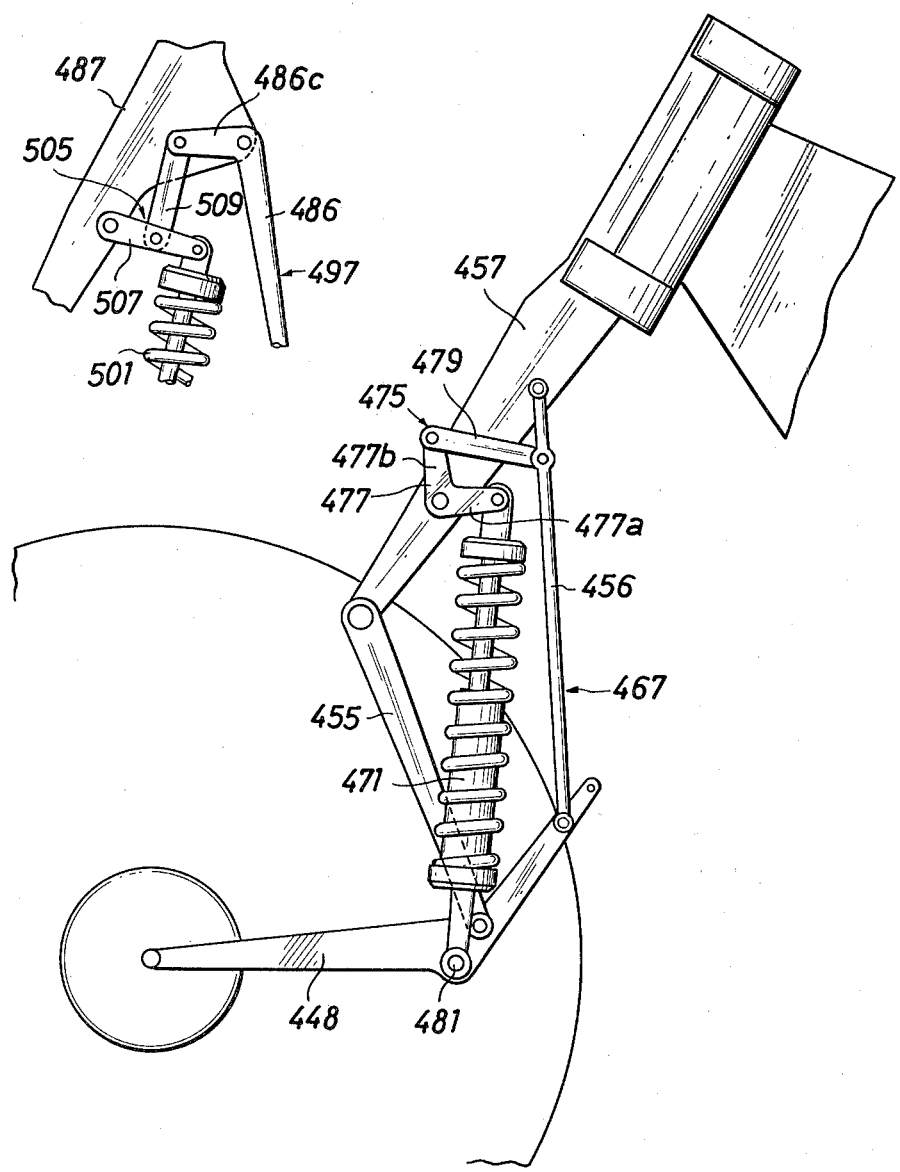

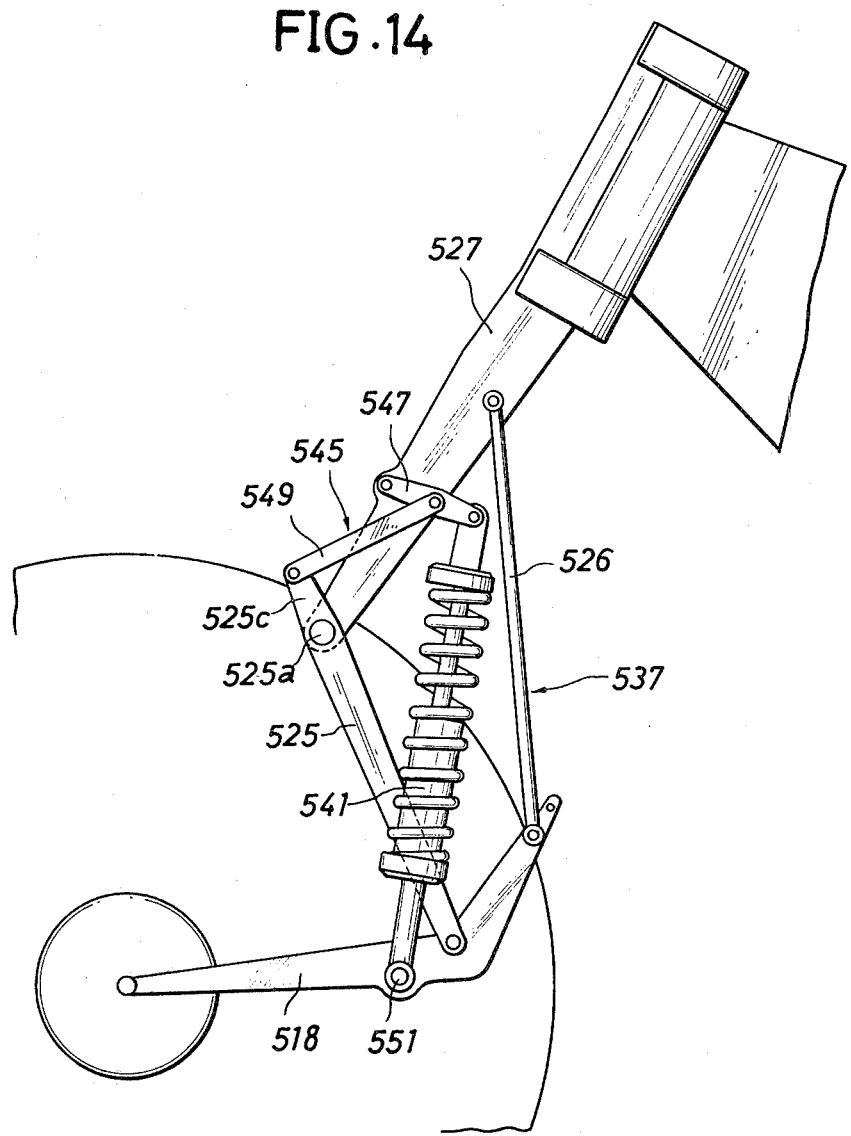

FRONT SUSPENSION FOR MOTOCYCLE

BACKGROUND OF THE INVENTION (1) Field of the Invention.

The present invention relates to a front suspension for motorcycles, and particularly a suspension employing a four-bar linkage.

(2) Description of the Prior Art.

Conventional front suspensions for motorcycles which have generally been employed are of the telescopic type in which each front fork is constructed of an expansion fork pipe and a pair of bottom cases. A new type of suspension is disclosed in U.S. Pat. No. 4,212,481 issued July 15, 1980. Such suspension has a front fork comprising an upper fork rotatably pivoted on the body of the motorcycle and a lower fork supporting the front wheel. These two forks are connected on either side by a front and a rear arm so as to define a four-bar linkage. The vertical movement of the front wheel following the undulations of the road is allowed by the transformation of the linkage. Movement of the front axle can be controlled so as to move along a straight path and approximately parallel to the axis of rotation of the handle bar by arranging the front and rear arms diagonally and converging downwardly. A shock absorber for absorbing and damping the movement of the front wheel caused by the transformation of the linkage is located between two members chosen from among the two arms and the lower fork, or between the upper fork and a member chosen from among the two arms and the lower fork.

Advantages provided by the aforesaid new suspension of the four-bar linkage type are, firstly, that the front wheel is allowed to move more smoothly and an increased rigidity is provided for the suspension compared with the telescopic type suspension wherein a sliding resistance is generated between the fork pipe and the bottom cases during the extension and the contraction of the suspension since the suspension comprises a linkage. Secondly, that the performance of the front wheel in following road irregularities is improved since a long stroke of the front wheel is permitted. Also, only a short stroke is sufficient for the shock absorber while a long stroke of the front wheel is permitted, thereby requiring only a small-sized and lightweight shock absorber.

SUMMARY OF THE INVENTION

The present invention provides an improved front suspension having advantages as hereinbefore described. An object of the present invention is to provide a front suspension for motorcycles comprising a second linkage serving as a load transmitting passage in the upward and downward movement of the front wheel and located between at least one first linkage constructed of a four-bar linkage and a shock absorber, characterized in that the second linkage is formed so that the movement of one end thereof adjacent to the first linkage caused by the transformation of the first linkage is converted into a progressively enlarged movement of the other end thereof adjacent to the shock absorber, i.e., the progressively enlarged stroke of the shock absorber. Therefore, according to the present invention, the shock absorber is operated at a greater increasing rate of the stroke than that of the front wheel to generate a shock absorbing force. Due to the characteristic progressive shock absorbing force, the performance in following road irregularities is further improved, the center of gravity of the motorcycle can be lowered by lowering the position of the driver's seat and also the diving of the front wheel unit of the motorcycle while braking can be reduced.

Another object of the present invention is to provide a front suspension for motorcycles wherein a single shock absorber is located in front of the upper part of the upper fork and a rod forming a load transmitting passage together with the second linkage is provided to connect the first linkage and the shock absorber.

A further object of the present invention is to provide a front suspension for motorcycles wherein a second linkage can be interposed between a first linkage and a corresponding shock absorber even when a pair of first linkages are provided on the right and left side of the motorcycle, respectively, and a shock absorber is provided for each first linkage.

In order that the invention may more readily be understood, reference will be made to the accompanying drawings in the following detailed description.

BRIEF DESCRIPTION OF THE DRAWINGS

FIG. 12 is a side elevational view of an eighth embodiment of a suspension according to the present invention, relating to the suspension of FIG. 10.

FIG. 13 is a side elevational view of the essential part of a ninth embodiment of a suspension according to the present invention, relating to the suspension of FIG. 10.

FIG. 14 is a side elevational view of a tenth embodiment of a suspension according to the present invention, relating to the suspension of FIG. 10.

DETAILED DESCRIPTION OF PREFERRED EMBODIMENTS

Figure 1:
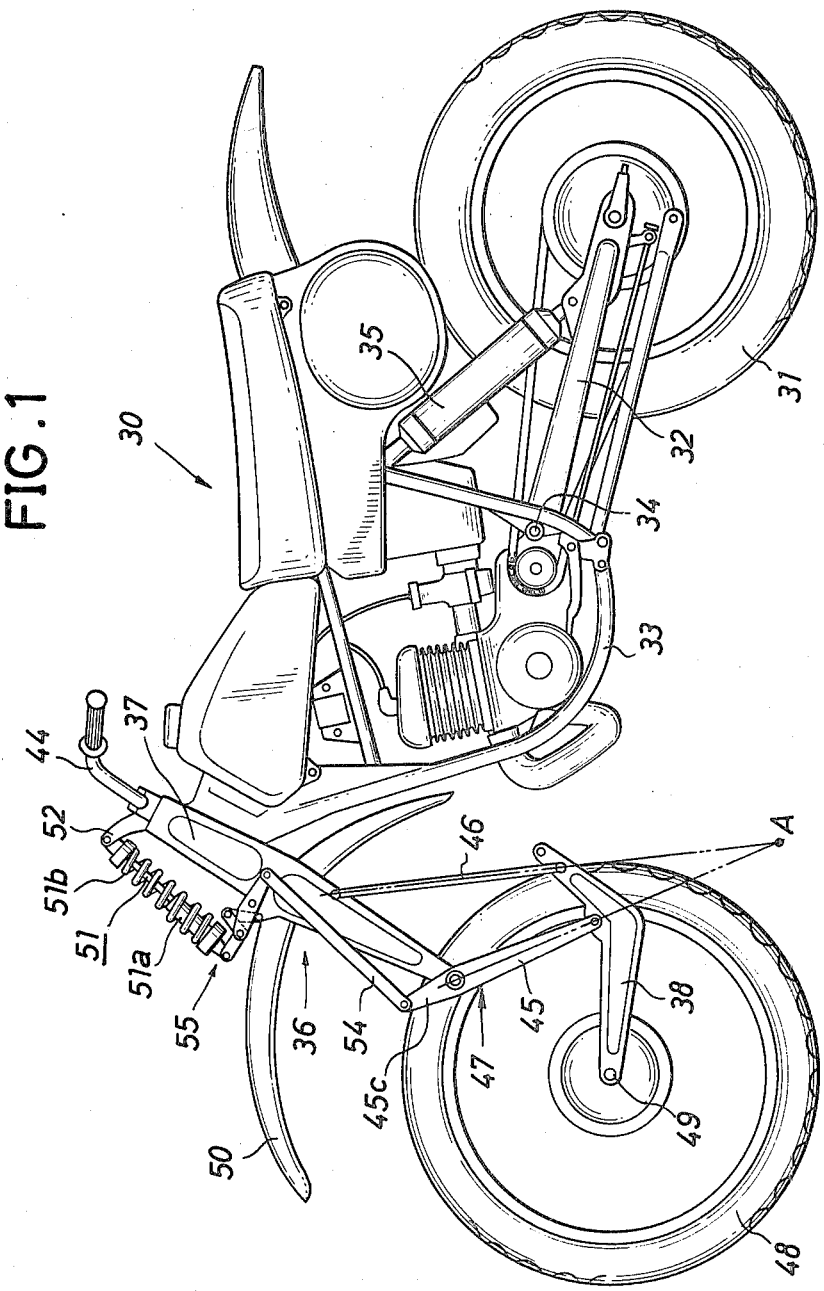
FIG. 1 is a general side elevational view of a motorcycle equipped with a suspension according to a first embodiment of the present invention comprising a single shock absorber and a tension rod.
Figure 2:
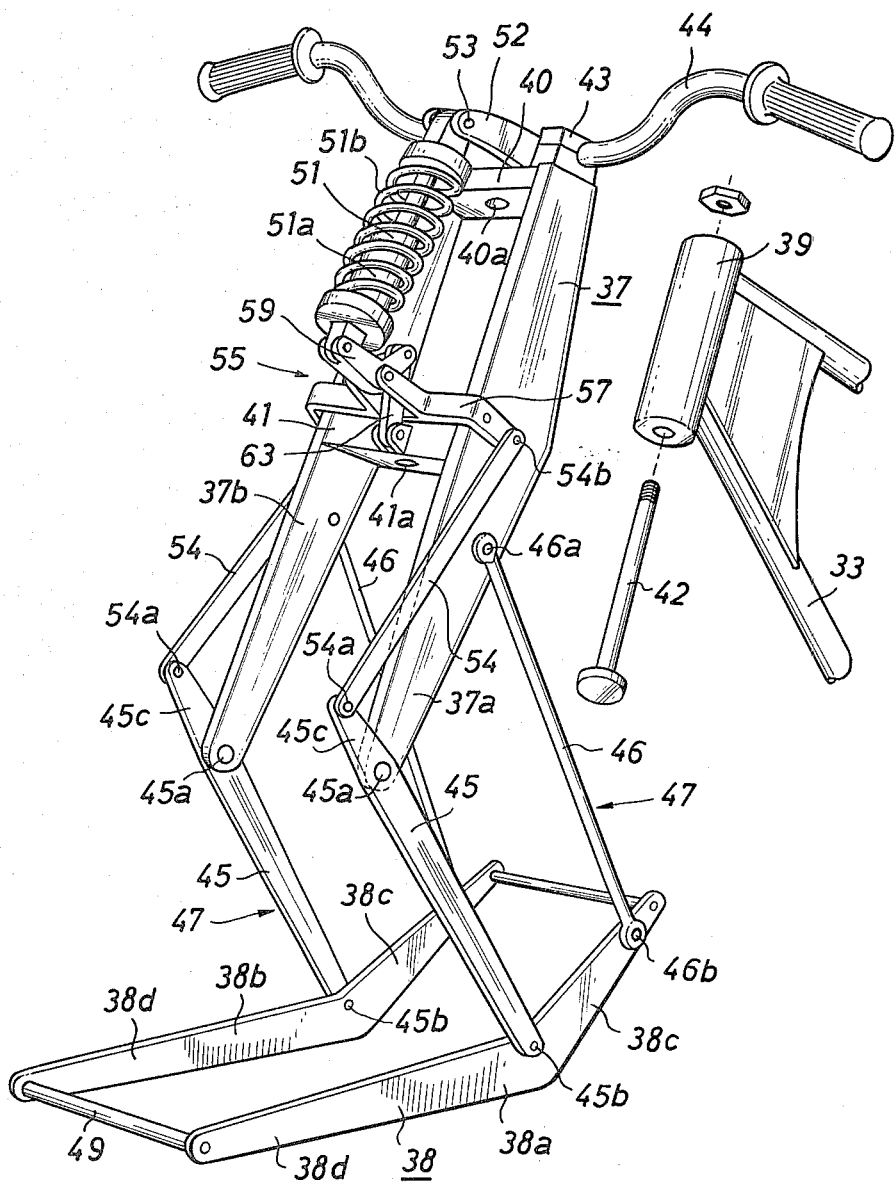
FIG. 2 is a perspective view of the suspension of FIG. 1.

With reference to FIG. 1, the suspension for the rear wheel 31 of a motorcycle 30 comprises a rear fork assembly 32 supporting at the rear end thereof a rear wheel 31 and being pivotably mounted on a frame 33 by means of a pivot shaft 34 at the front end thereof, and a pair of shock absorbers 35 located between and joined with the rear fork assembly 32 and the upper part of the frame 33. A front fork assembly 36 of a front suspension comprises an upper fork assembly 37 and a lower fork assembly 38. Referring to FIG. 2, the upper fork assembly 37 is pivotably joined with the frame 33 by inserting a head pipe 39 fixed to the front end of the frame 33 between a top bridge 40 and a bottom bridge 41 of the upper fork assembly 37 and inserting, in common, a steering shaft 42 through holes 40a and 41a formed in the respective bridges 40 and 41 and through the pipe 39. The steering movement of the upper fork assembly 37 is controlled by a steering or handle bar 44 fixed to the upper surface of the top bridge 40 by means of brackets 43. Respective upper ends of two arms, i.e. a front arm 45 and a rear arm 46, are pivotably joined with each of the upper side members 37a and 37b of the upper fork assembly 37 by means of pivot shafts 45a and 46a respectively, and the lower ends of the front arm 45 and the rear arm 46 are pivotably joined with each of the lower side members 38a and 38b of the lower fork assembly 38 by means of pivot shafts 45b and 46b respectively. Thus, the upper fork assembly 37 and the lower fork assembly 38 are connected by means of two sets of arms each including the front arm 45 and the rear arm 46, with each set of the arms connecting the corresponding upper and lower side members. Thus, two sets of four-bar linkages 47, each comprising the upper side member 37a (37b) as a fixed link, the lower side member 38a (38b), and the set of the arms 45 and 46 as movable links are formed. Two four-bar linkages 47 are provided, one on each of the right and left sides of the motorcycle, respectively. Each of the lower side members 38a and 38b of the lower fork assembly 38 is bent so as to include a diagonal base part 38c to which the arms 45 and 46 are joined and an extending part 38d extending forwardly and substantially horizontally. An axle 49 of a front wheel 48 is supported between the front ends of the extending parts 38d of the lower side members 38a and 38b. Thus, the front wheel 48 is supported by the lower fork assembly 38 at a position forwardly of pivot shafts 45b and 46b respectively joining the lower fork assembly and the arms 45 and 46. A single shock absorber 51 is disposed in front of the steering bar 44, as shown in FIG. 1, above a front fender 50 and forwardly of the front of the upper part of the upper fork assembly 37. The shock absorber 51 comprises a damper 51a the gas pressure type, liquid pressure type or the gas-liquid pressure type and a helical compression spring 51b. The upper end of the shock absorber 51 is joined with a fixed arm 52, provided at the upper end of the upper fork assembly 37, so as to be swingable forwardly and rearwardly, as illustrated in FIG. 2. On either lateral side, the front arm 45 comprising the front side of the linkage 47 has an end part 45c extending upwardly past the pivot shaft 45a joining the front arm 45 to the upper fork assembly 37. The bottom end of a rod 54 serving as a load transmitting member and connecting the linkage 47 to the shock absorber 51 is pivotably joined to the end part 45c by means of a pivot shaft 54a. In this embodiment, the rod 54 is joined to the front arm 45, however, the lower end of the rod 54 may be joined to the rear arm 46 by forming an extension extending from the rear arm 46 over the pivot shaft 46a. A pair of rods 54 are provided for the right and left linkages 47 respectively. The lower end of the rod 54 is joined to the upper end 45c of the front arm 45a or the upper end of the rear arm 46, in this embodiment so that the rod 54 will function as a tension rod in transmitting the transformation of the linkage 47 to the shock absorber 51. The upper end of the rod 54 and the lower end of the shock absorber 51 are connected by means of a progressive linkage 55 functioning as a load transmitting passage. The linkage 55 functions such that the displacement of an end thereof adjacent to the four-bar linkage 47 is converted into a progressive displacement of an output end of the linkage 55 adjacent to the shock absorber 51 causing the displacement of the shock absorber 51. By way of explanation of the progressive linkage 55, i.e. the second linkage, relative to the four-bar linkage 47, i.e., the first linkage, reference is made to FIG. 3. The progressive linkage 55 comprises a first link 57 pivotably joined at the intermediate part thereof to the upper fork assembly 37 by means of a pivot shaft 56 and joined at the rear end thereof to the upper end of the rod 54 by means of a pivot shaft 54b, a second link 59 having a front extension 59a and an upper extension 59b together defining a widely opening V-shape, joined at the bent part thereof to the front end of the first link 57 by means of a pivot shaft 58 and joined at the front extension 59a to the lower end of the shock absorber 51 by means of a pivot shaft 60, and a third link 63 pivotably joined to the upper extension 59b and the upper fork assembly 37 by means of pivot shafts 61 and 62, thus connecting the upper extension 59b to the upper fork assembly 37. The rear part of the first link 57 is bifurcated as shown in FIG. 2 and the rear ends of the bifurcated part are joined to the right and left rods 54, respectively. The third link 63 intersects the first link 57 from below to above the first link 57.

Figure 3:
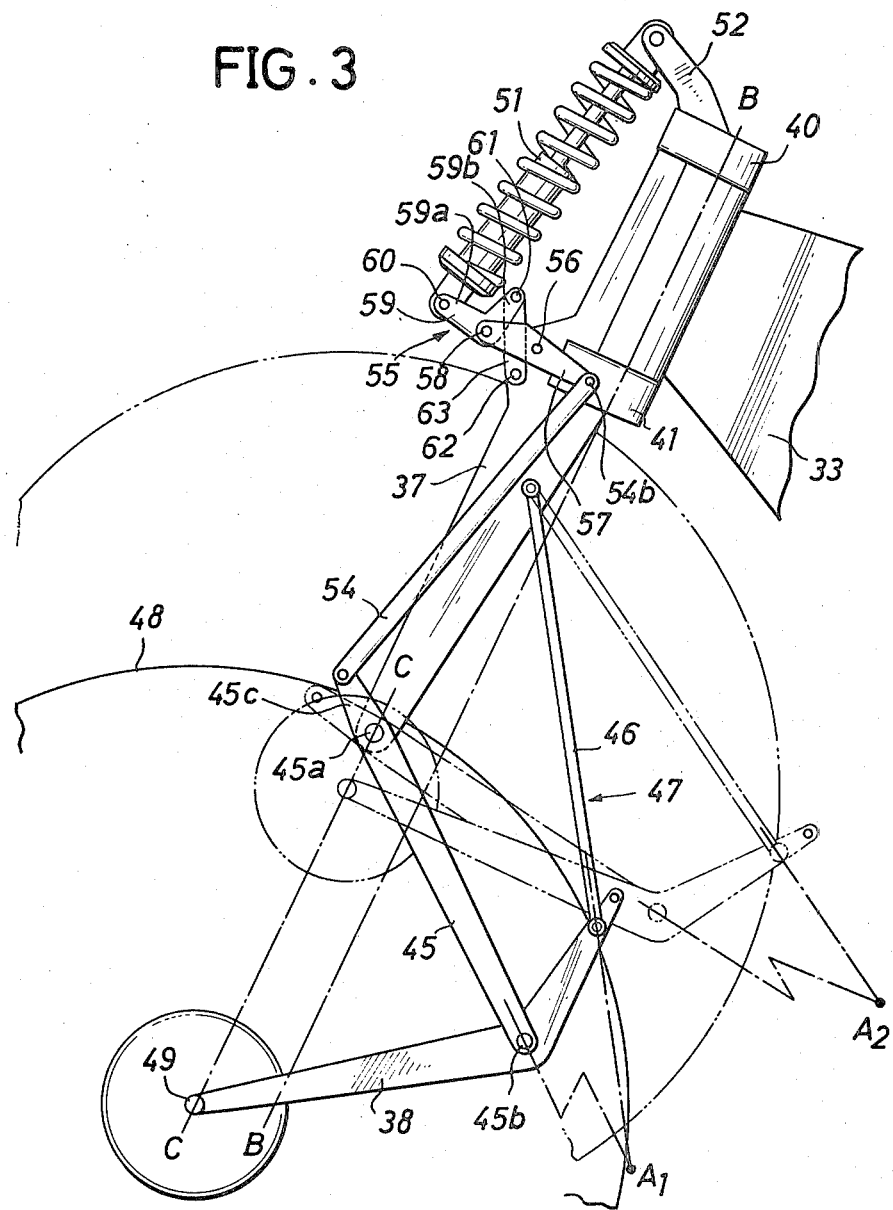
FIG. 3 is a side elevational view of the suspension of FIG. 1.
Figure 15:
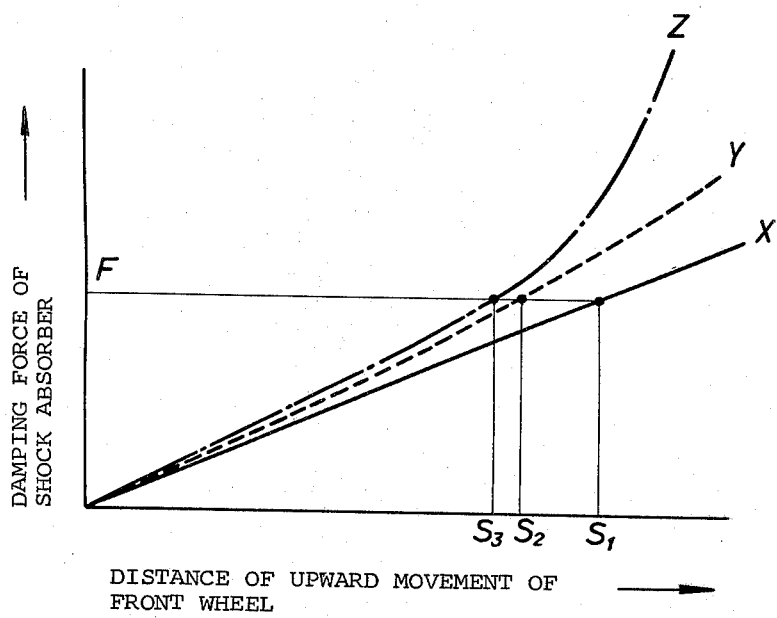
FIG. 15 is a graph showing, in comparison, the shock absorbing characteristics of a telescopic type suspension and a suspension of the present invention.

The operation of the suspension will be explained hereinbelow. The rise and fall of the front wheel 48 in following the road irregularities is allowed by the transformation of the four-bar linkage 47. During the transformation, the lower fork assembly 38 swings about an intersecting point of the arms 45 and 46, arranged so as to converge on a point located at a lower and rear position as shown in FIG. 1, which intersecting point serves as an instantaneous center of rotation A of the lower fork assembly 38 while the position is varied between points such as A1 and A2 (FIG. 3). Accordingly, the front axle 49 rises and falls substantially in parallel with the axis B—B of the rotation of the steering bar and along a substantially straight line C—C. With the upward movement of the front wheel 48, the arm 45 turns about the pivot shaft 45a in a counterclockwise direction in FIG. 3. Consequently, on either lateral side, the rods 54 disposed between the first linkage 47 and the second linkage 55 are pulled down by a pulling force. With the downward movement of the rods 54, the first link 57 is turned about the pivot shaft 56 in a clockwise direction causing the second link 59 to rise to compress the shock absorber 51. During such action of the linkage, the second link 59 turns about the pivot shaft 58 in a clockwise direction since the upper extension 59b of the second link 59 is restrained by the third link 63 relative to the upper fork assembly 37. Therefore, the shock absorber 51 is compressed by a distance corresponding to the sum of the lift and the rotation of the second link 59. The degree of rotation of the second link 59 increases with the increase in the upward movement of the front wheel 48, thereby permitting the downward movement of the rod 54, so that the damping characteristic of the shock absorber 51 against the upward movement of the front wheel 48 and the transformation of the four-bar linkage 47 follows a progressive pattern. Such pattern is shown by a curve Y or Z of second degree in FIG. 15 wherein the abscissa and the ordinate represent the distance of the upward movement of the front wheel and the damping force of the shock absorber, respectively. The characteristic as shown by the curve Y or Z is provided by the progressive linkage 55 having an input end defined by the junction of the rod 54 with the first link 57, i.e., the end part of the first link 57 adjacent to the linkage 47, and an output end defined by the junction of the second link 59 with the shock absorber 51, i.e., the lower end of the shock absorber 51, and capable of progressively enlarging the displacement of the output end relative to the input end. A curve X shown in the graph of FIG. 15 shows the characteristic of a conventional telescopic type front suspension. It will be understood that the damping characteristic of the conventional telescopic suspension is proportional to the upward movement of the front wheel whereas the provision of the progressive linkage mechanism 55 between the four-bar linkage 47 and the shock absorber 51 causes the shock absorber to produce a damping force at a greater rate than the rate of increase of the upward movement of the front wheel. The damping characteristics as shown by the curve Y or Z is dependent on the shapes and dimensions of the first, second and the third links 57, 59 and 63. Any characteristic of the suspension similar to the characteristic Y or Z can be selected by selectively determining the lever ratios of the progressive linkage 55. In order to generate a damping force F, the front wheel is required to move upwardly by a distance S1 in the conventional suspension having a characteristic shown by the characteristic curve X whereas in the suspension according to the present invention having a damping characteristic as shown by the curve Y or Z, a smaller upward movement of S2 or S3, respectively, of the front wheel is required, thus improving the road irregularity following performance of the front wheel. Also, the height of the driver's seat can be lowered by a distance corresponding to the reduction in the upward movement of the front wheel so as to lower the center of gravity of the motorcycle, and the diving of the front part of a motorcycle during braking can be reduced.

The following description relates to modified forms of a progressive linkage for a suspension which, similarly to the embodiment as hereinbefore described, are provided with a single shock absorber disposed forwardly of the upper part of an upper fork assembly and has tension rods connecting the respective four-bar linkage and the shock absorber.

Figure 4:
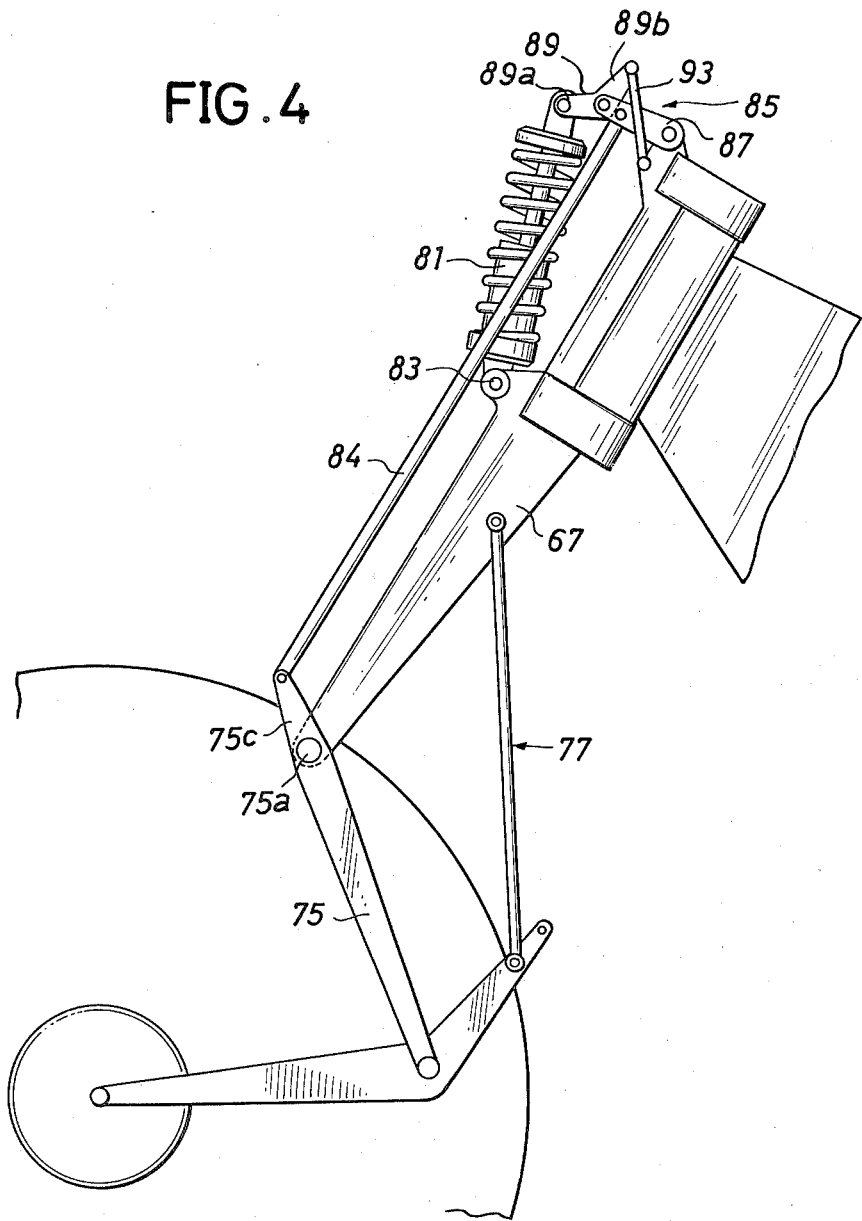
FIG. 4 is a side elevational view of a second embodiment of a suspension according to the present invention, relating to the suspension of FIG. 1.

Referring to FIG. 4, a progressive linkage 85 is interposed between the upper end of a shock absorber 81 and the upper ends of rods 84. The shock absorber 81 is pivotably joined at the lower end thereof to an upper fork assembly 67. The progressive linkage 85 comprises a first link 87 pivotably joined at the rear end thereof to the top end of the upper fork assembly 67 and joined at an intermediate part thereof to the respective rods 84, a second link 89 formed in a widely opening V-shape, joined at the bent part thereof to the front end of the first link 87 and joined at its front extension 89a to the upper end of the shock absorber 81, and a third link 93 connecting an upper extension 89b of the second link 89 with the upper fork assembly 67. The lower end of each rod 84 is joined to a corresponding arm 75 at its extension 75c thereof extending over a joint 75a between the upper fork assembly 67 and the arm 75.

In this embodiment, when the first link 87 is turned in a counterclockwise direction with the downward movement of the rods 84 caused by the transformation of four-bar linkages 77, the second link 89 compresses as the shock absorber 81 while being turned in a counterclockwise direction due to the restraint at the extension 89b by the third link 93 relative to the upper fork assembly 67, so that the quantity of the compression of the shock absorber 81 is progressively increased. The same action of the suspension as described above can be achieved if the upper ends of the rods 84 are joined to the front end of the first link 87.

Figure 5:
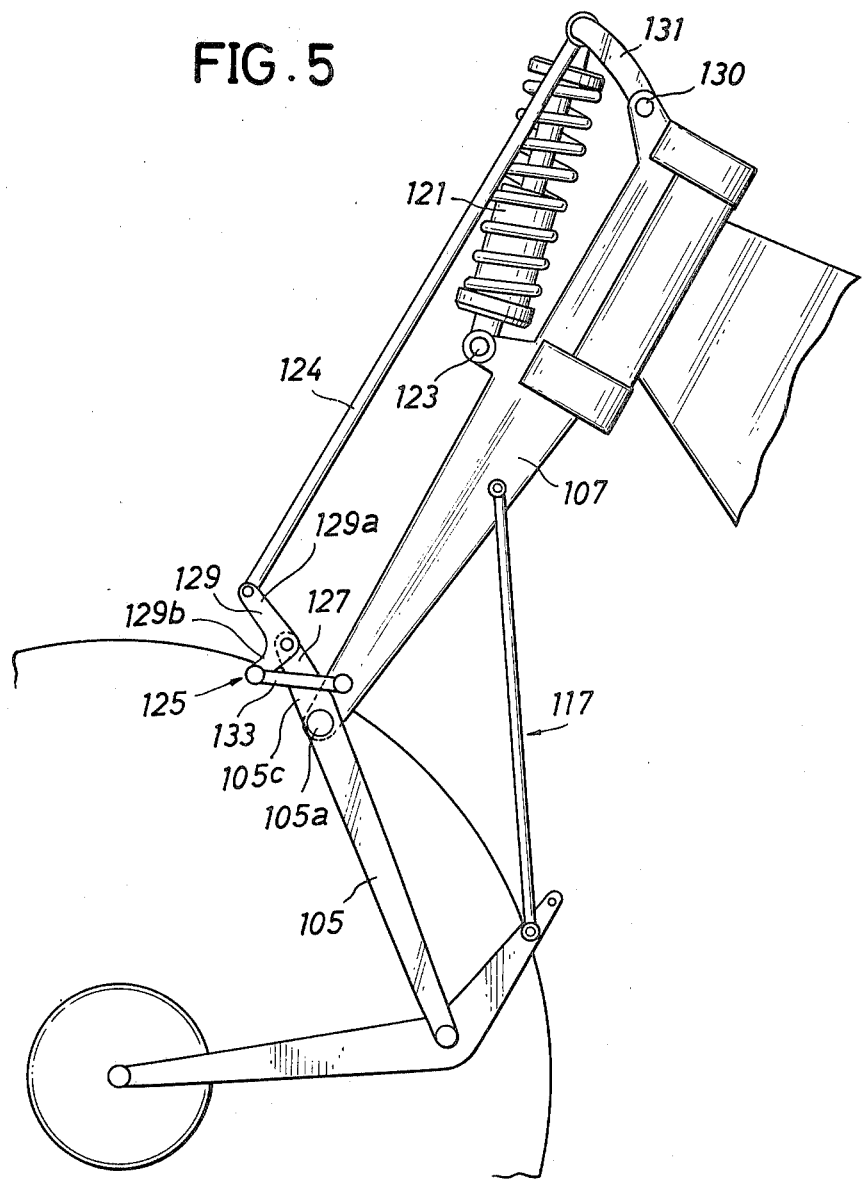
FIG. 5 is a side elevational view of a third embodiment of a suspension according to the present invention, relating to the suspension of FIG. 1.

In the embodiment shown in FIG. 5, each progressive linkage 125 is interposed between a rod 124 and a four-bar linkage 117, and an extension 105c of an arm 105 extending over a pivot shaft 105a joining an arm 105 to an upper fork 107 is employed as a first link 127 of the progressive linkage 125. The progressive linkage 125 comprises the first link 127, a second link 129 formed in a V-shape having a front extension 129a and a lower extension 129b, joined at the bent part thereof to the first link 127 and also joined at the front extension 129a to the lower end of a rod 124, and a third link 133 connecting the lower extension 129b of the second link 129 to the upper fork assembly 107. The lower end of a shock absorber 121 is pivotably joined to the upper fork assembly 107 by means of a pivot shaft 123, while the upper end of the shock absorber 121, together with the upper end of a lever 131 pivotably joined to the upper end of the upper fork assembly 107 by means of a pivot shaft 130, is joined to the upper end of the rod 124. In this embodiment, with the counterclockwise rotation of the first link 127 about the pivot shaft 105a, the rod 124 is pulled down through the second link 129. With this action, the downward movement of the rod 124 and the quantity of compression of the shock absorber 121 are progressively increased due to the counterclockwise turning of the second link 129.

There will be described hereinbelow some embodiments of front suspensions according to the present invention, each comprising a single shock absorber combined with a pair of rods for applying a compressive force to the shock absorber while functioning as compression rods.

Figure 6:
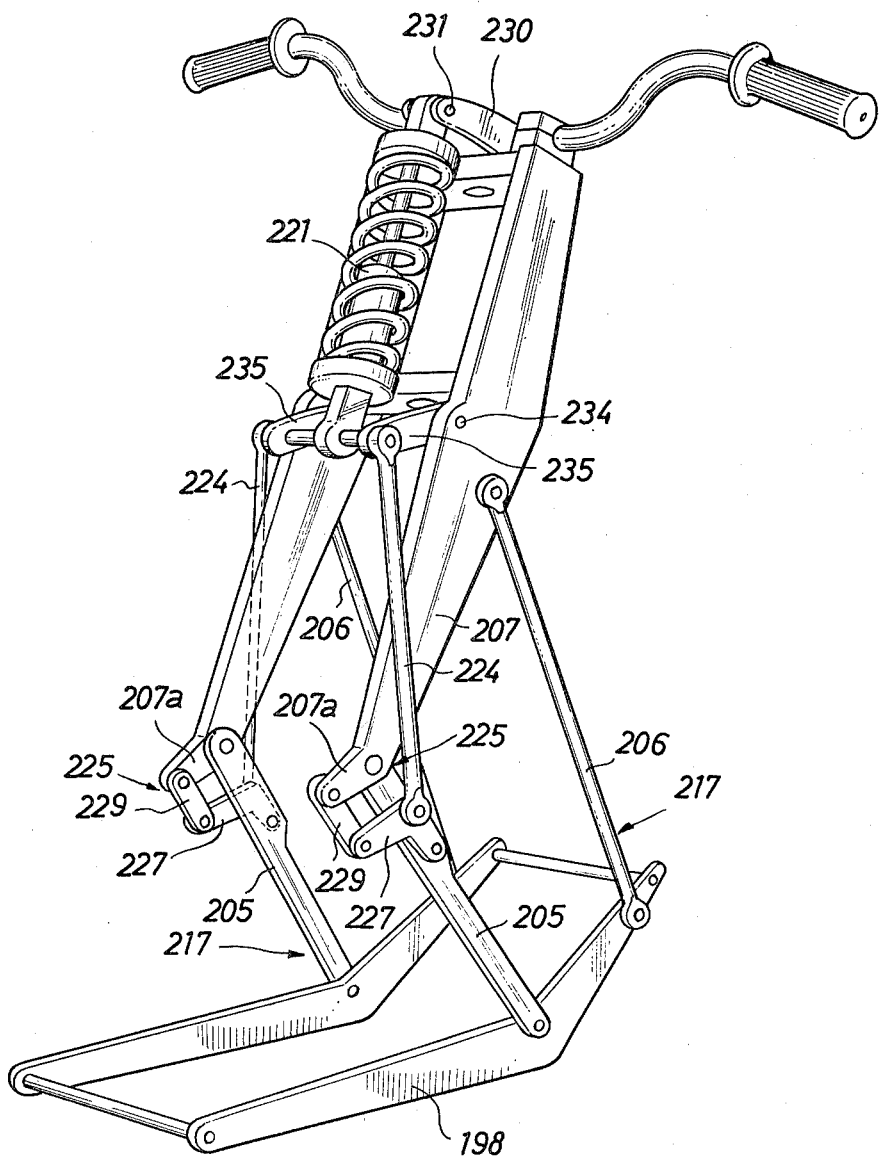
FIG. 6 is a perspective view of a fourth embodiment of a suspension according to the present invention comprising a single shock absorber and a compression rod.
Figure 7:
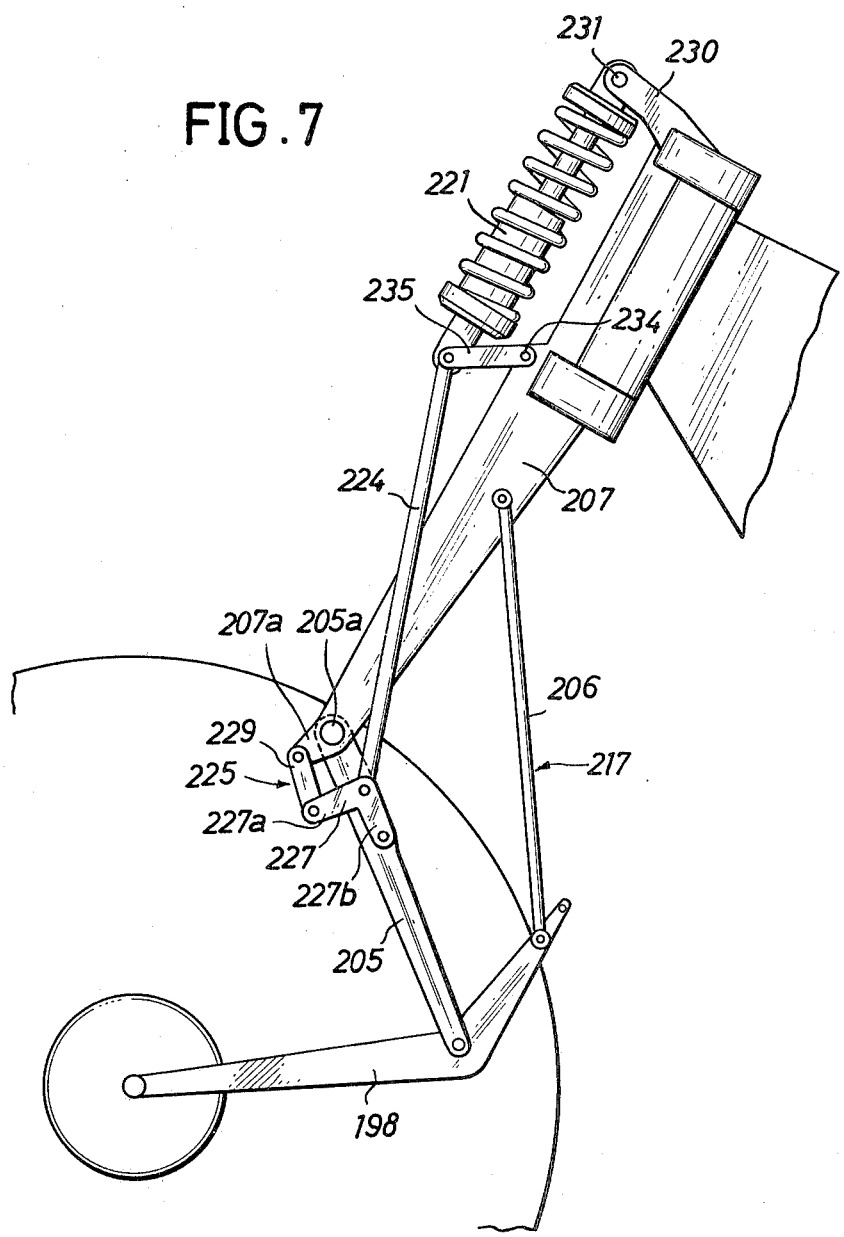
FIG. 7 is a side elevational view of the suspension of FIG. 6.

Although the links and linkages of the suspensions according to the invention are provided in pairs on either lateral side of the motorcycle, only one side will be described for brevity. Referring to FIGS. 6 and 7, the upper end of a shock absorber 221 is pivotably joined to the front end of a fixed arm 230 fixed to the upper end of an upper fork assembly 207 by means of a pivot shaft 231. A rod 224 is interposed between a progressive linkage 225 and the shock absorber 221. The upper end of the rod 224, together with the front end of a lever 235 pivotably joined at the rear end thereof to the upper fork assembly 207 by means of a pivot shaft 234, is joined to the lower end of the shock absorber 221. The progressive linkage 225 comprises a first link 227 formed in a V-shape, and a second link 229 connecting a front extension 227a of the first link 227 to the upper fork assembly 207. A lower extension 227b of the first link 227 is joined to an arm 205 of a four-bar linkage 217. The lower end of the rod 224 is joined to the bent part of the first link 217. In contrast to the embodiments as hereinbefore described, the first link 227 is joined to the arm 205 at a position on the arm 205 between the upper fork assembly 207 and a lower fork assembly 198. The second link 229 is joined to the upper fork assembly 207 at an extension 207a formed at the lower end of the upper fork assembly 207 and bent slightly upward. As shown in FIG. 6, the linkage 225, the arm 205 and the rod 224 are provided in pairs on respective sides of the motorcycle. With the transformation of the four-bar linkage 217 caused by the upward movement of the front wheel, the arm 205 turns about the pivot shaft 205a in a counterclockwise direction, then the rod 224 is pushed up to compress the shock absorber 221 due to upward movement of the first link 227. During this action, the first link 227 is forced to turn in a clockwise direction as the front extension 227a is restrained by the second link 229 relative to the upper fork assembly 207, so that a quantity corresponding to the rotation of the first link 227 is added to the upward movement of the rod 225. Consequently, the compression of the shock absorber is progressively increased.

In order to provide the same operation of the suspension as described above, the lower extension 227b of the first link 227 need not necessarirly be joined to the front arm 205; the lower extension 227b of the first link 227 may be joined to a rear arm 206 which also moves upwardly as in the upward movement of the front arm 205 or the lower fork assembly 198.

Figure 8:
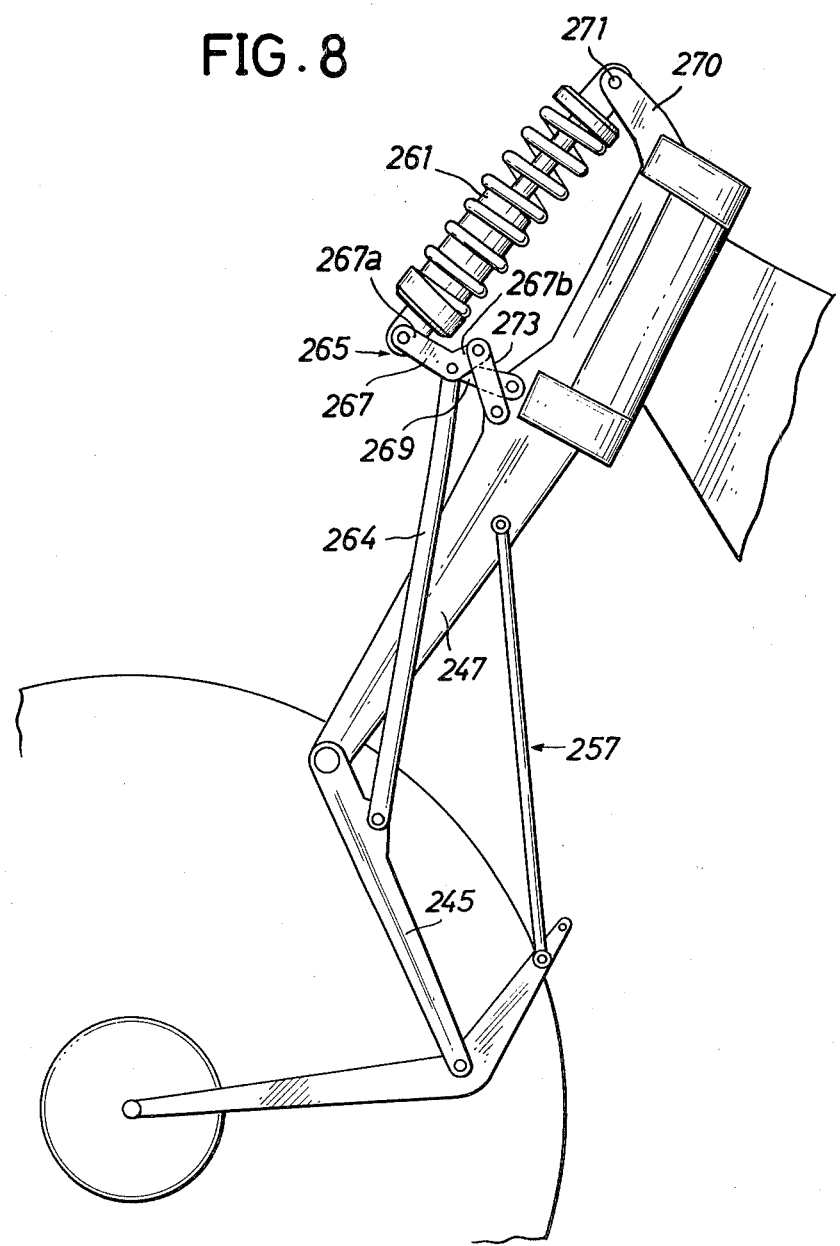
FIG. 8 is a side elevational view of a fifth embodiment of a suspension according to the present invention, relating to the suspension of FIG. 6.

In a fifth embodiment of a suspension according to the present invention as shown in FIG. 8, a progressive linkage 265 is interposed between a shock absorber 261 and a rod 264. The upper end of the shock absorber 261 is pivotably joined through a shaft 271 of the front end of a fixed arm 270 fixed to the upper end of an upper fork assembly 247. The lower end of the rod 264 is joined to an arm 245. The progressive linkage 265 comprises a first link 267 formed in a V-shape having a front extension 267a and an upper extension 267b, a second link 269, and a third link 273. The upper end of the rod 264 is joined to the bent part of the first link 267. The lower end of the shock absorber 261 is joined to the front extension 267a of the first link 267. The second link 269 is pivotably joined at the rear end thereof to the upper fork assembly 247 and at the front end thereof to the bent part of the first link 267. The third link 273 connects the upper extension 267b of the first link 267 to the upper fork assembly 247, while crossing the second link 269.

When the rod 264 is pushed up by the transformation of a four-bar linkage 257, the quantity of compression of the shock absorber 261 is progressively increased due to the composite motion of the upward movement of the first link 267 and the clockwise rotation of the first link 267 about a pivot provided at the bent part due to the restraint by the third link 273.

Figure 9:
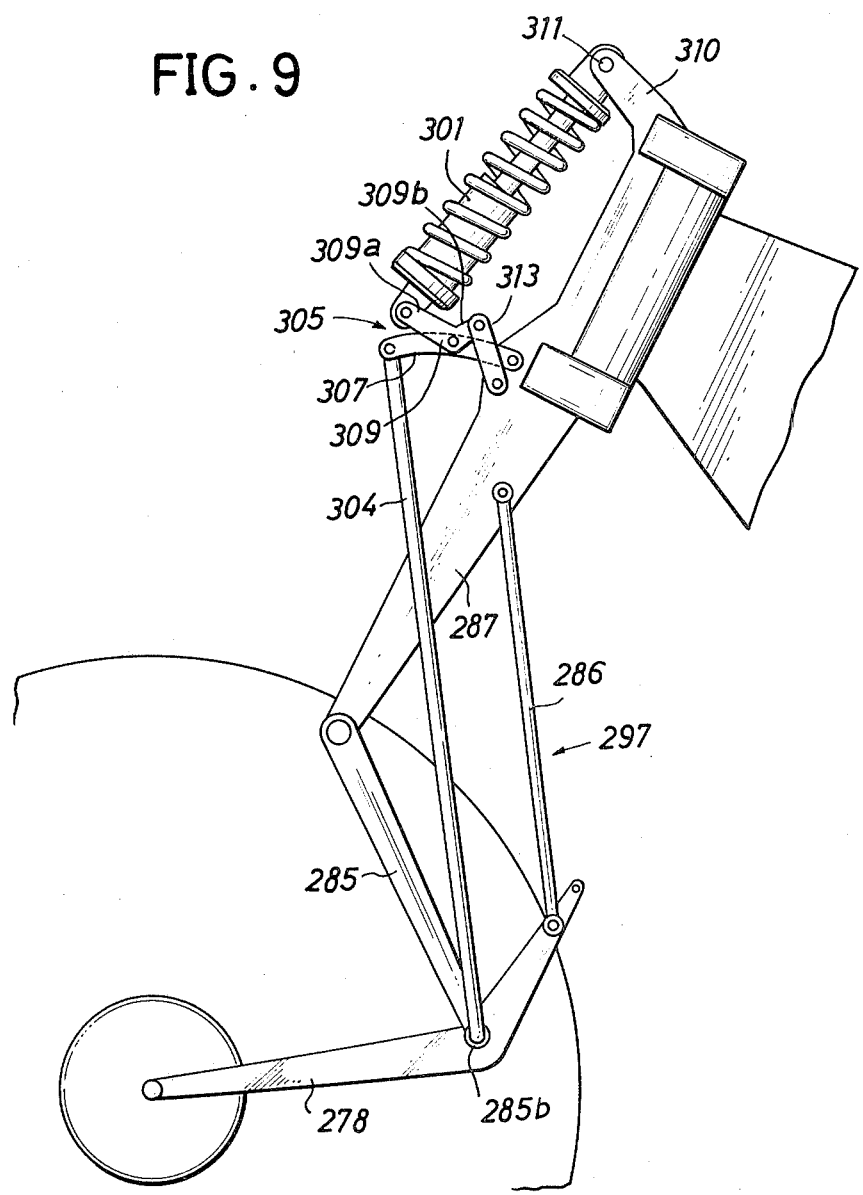
FIG. 9 is a side elevational view of a sixth embodiment of a suspension according to the present invention, relating to the suspension of FIG. 6.

In a sixth embodiment of a suspension according to the present invention as shown in FIG. 9, similarly to the embodiment of FIG. 8, a rod 304 is interposed between two linkages 297 and 305, while the progressive linkage 305 is interposed between the rod 304 and a shock absorber 301. The upper end of the shock absorber 301 is pivotably joined to the front end of a fixed arm 310, fixed to the upper end of an upper fork assembly 287, by means of a pivot shaft 311. The lower end of the rod 304 is joined to a lower fork assembly 278. In the embodiment as shown in FIG. 9, the lower end of the rod 304 is joined to the lower fork assembly 278 by means of a pivot shaft 285b joining an arm 285 to the lower fork assembly 278. The lower end of the rod 304 may be joined either to arms 285 or 286. The progressive linkage 305 comprises a first link 307 which is bent upwardly, a second link 309 formed in a V-shape having a front extension 309a and an upper extension 309b, and a third link 313 intersecting the first link 307. The upper end of the rod 304 is joined to the front end of the first link 307 which is pivotably joined at the rear end thereof to the upper fork assembly 287. The bent part of the second link 309 is joined to the intermediate part of the first link 307. The front extension 309a of the second link 309 is joined to the lower end of the shock absorber 301, while the upper extension 309b is connected to the upper fork assembly 287 by the third link 313. When the rod 304 is pushed up by the transformation of the four-bar linkage 297, the second link 309 is moved upwardly through the first link 307 while being turned in a clockwise direction, so that the shock absorber 301 is progressively compressed.

In the embodiments described hereinbelow, two shock absorbers are provided for a pair of four-bar linkages for the right and left sides respectively and each shock absorber is connected to the corresponding four-bar linkage through a progressive linkage without employing a rod.

Although in the following embodiments the links, linkages and shock absorbers are provided in pairs for the right and left sides respectively one of each pair will be described hereinafter for brevity.

Figure 10:
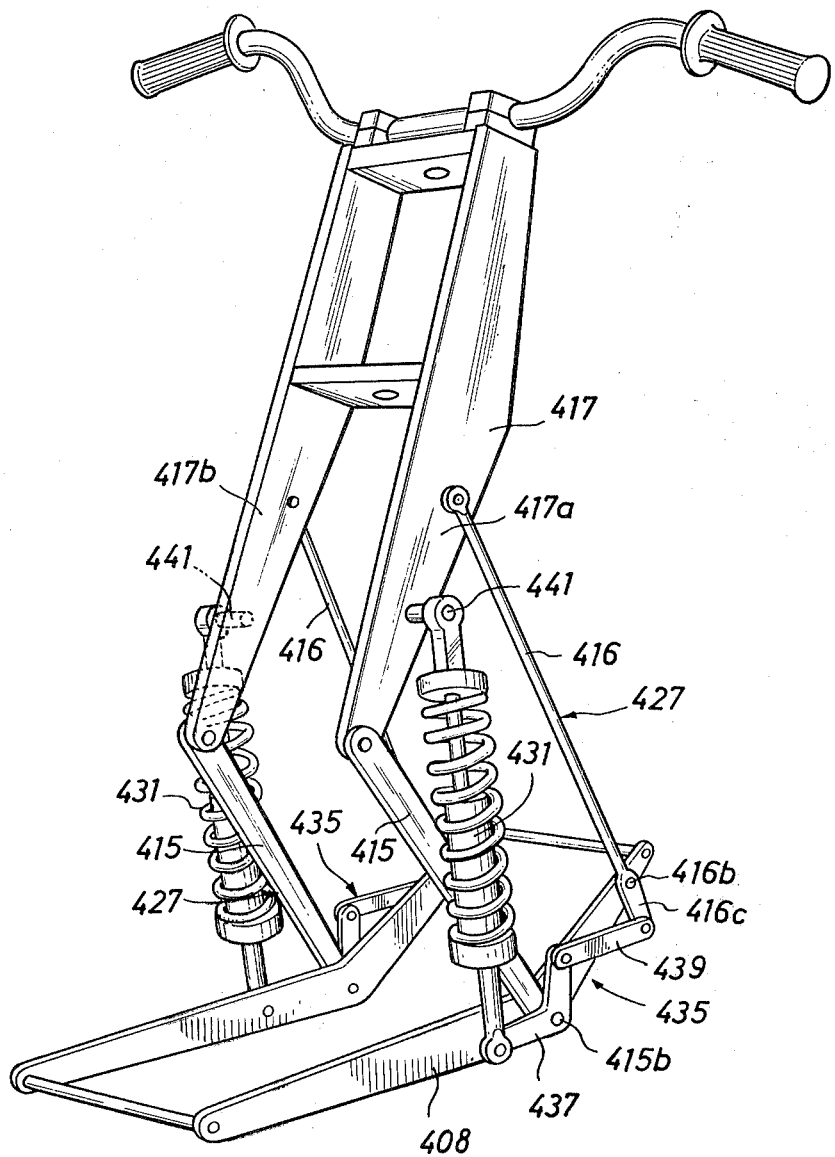
FIG. 10 is a perspective view of a seventh embodiment of a suspension according to the present invention comprising a pair of first linkages disposed on the right and left sides of a motorcycle respectively, each first linkage being provided with a shock absorber.
Figure 11:
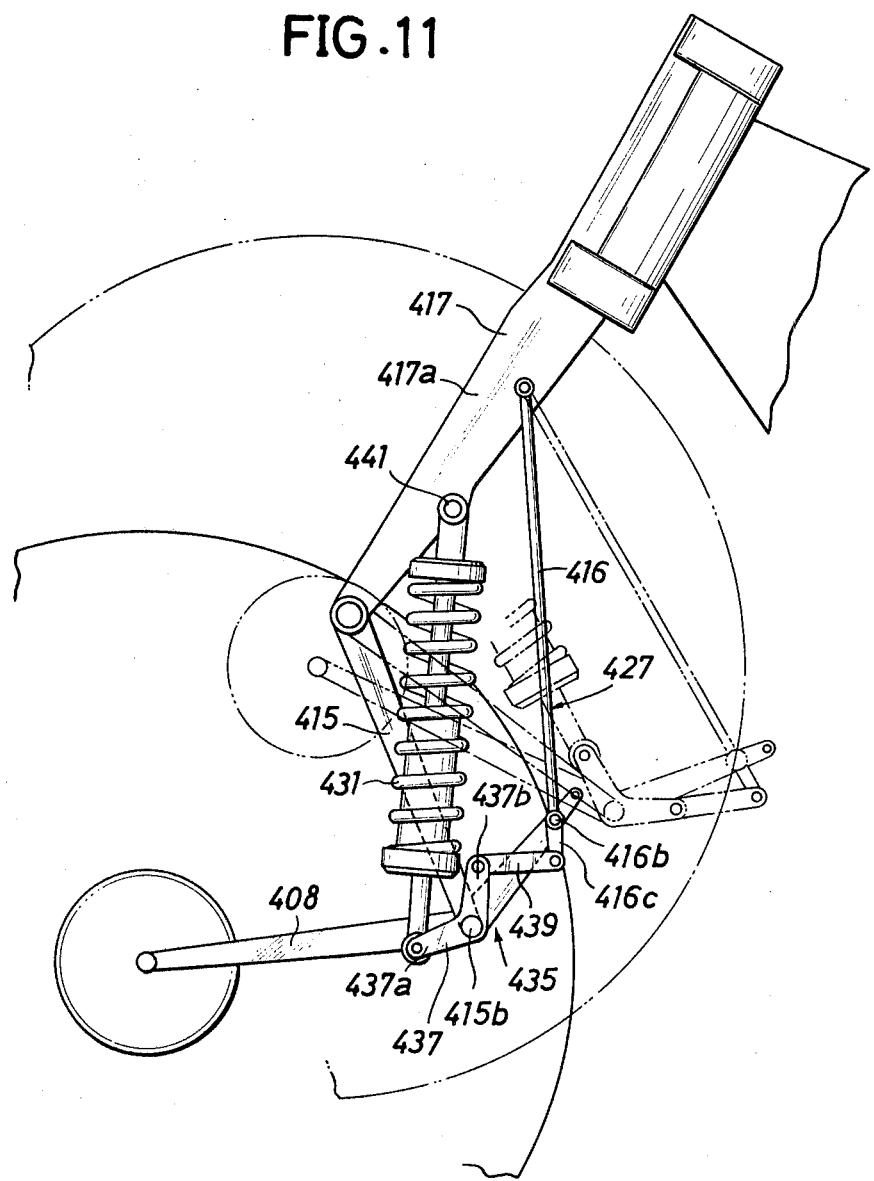
FIG. 11 is a side elevational view of the suspension of FIG. 10.

Referring to FIGS. 10 and 11, the upper end of a shock absorber 431 is pivotably joined to a side member 417a (417b) of an upper fork assembly 417 by means of a pivot shaft 441. A rear arm 416 has an extension 416c extending downwardly below the junction between the rear arm 416 and a lower fork assemly 408. A progressive linkage 435 is interposed between the extension 416c and the lower end of the shock absorber 431. The constructions of the right and left four-bar linkages 427 are identical with each other. The progressive linkage 435 comprises a first link 437 formed in a V-shape having a front extension 437a and an upper extension 437b, and a second link 439. The first link 437 is pivotably joined at the bent part thereof to the lower fork assembly 408 by means of a pivot shaft 415b joining the arm 415 to the lower fork assembly 408. The front extension 437a of the first link 437 is joined to the lower end of the shock absorber 431 while the upper extension 437b is connected to the extension 416c of the arm 416 by the second link 439. It will be apparent in the construction as described above that the part of the progressive linkage 435 adjacent to the four-bar linkage 427, i.e. the input end, comprises the junction between the extension 416c and the second link 439, while the part of the progressive linkage 435 adjacent to the shock absorber 431, i.e. the output end, comprises the junction between the first link 437 and the shock absorber 431.

With the transformation of the four-bar linkage 427 caused by the upward movement of the front wheel, the shock absorber 431 is compressed by the movement of the lower fork assembly 408 together with the first link 437. In addition, the damping force of the shock absorber 431 is progressively increased since the first link 437 is turned in a clockwise direction, as shown by phantom lines in FIG. 11, about the pivot shaft 415b to magnify the displacement of the input end to a larger displacement of the output end of the progressive linkage 435. The progressive linkage may be interposed between the lower end of the shock absorber and the front arm 415 by forming an extension, similar to the extension 416c of the rear arm 416, on the front arm 415 extending over the junction between the front arm 415 and the lower fork assembly 408 and joining the first link 437 to the front part of the lower fork assembly 408.

In an eighth embodiment of a suspension according to the present invention as shown in FIG. 12, the lower end of a shock absorber 471 is joined to a lower fork assembly 448 by means of a pivot shaft 481. A progressive linkage 475 comprises a first link 477 formed in a V-shape having a rear extension 477a and an upper extension 477b, and a second link 479. The first link 477 is pivotably joined at the bent part thereof to an upper fork assembly 457. The rear extension 477a of the first link 477 is joined to the upper end of the shock absorber 471. The second link 479 connects the upper extension 477b of the first link 477 to a rear arm 456. Thus, the progressive linkage 475 interposed between the four-bar linkage 467 and the shock absorber 471 is disposed adjacent to the upper end of the shock absorber 471.

With the upward movement of the lower fork assembly 448 together with the front wheel, the shock absorber 471 is compressed while the first link 477 is turned in a counterclockwise direction so that the quantity of compression of the shock absorber 471 is progressively increased. The second link 479 may connect the upper extension of the first link 477 and a front arm 455 by forming an extension extending downwardly below the front arm 455 on the upper fork assembly and joining the first link 477 to the extension of the upper fork assembly 457.

In a ninth embodiment of a suspension according to the present invention as shown in FIG. 13, although not illustrated in FIG. 13, the lower end of a shock absorber 501 is connected to a lower fork assembly similarly to the construction as shown in FIG. 12. An extension 486c is fomed on a rear arm 486 so as to extend from the junction between the rear arm 486 and an upper fork assembly 487. A progressive linkage 505 comprises a first link 507 and a second link 509. The first link 507 is joined at the front end thereof to the upper fork assembly 487 and is also joined at the rear end thereof to the upper end of the shock absorber 501. The second link 509 connects the intermediate part of the first link 507 to the extension 486c of the arm 486. With the transformation of the four-bar linkage 497, the first link 507 is turned in a counterclockwise direction by the second link 509 so that the quantity of compression of the shock absorber 501 is increased by a quantity corresponding to the rotation of the first link 507. The same operation of the suspension may be provided by joining the lower end of the second link 509 to the rear end of the first link 507.

In a tenth embodiment of a suspension according to the present invention as shown in FIG. 14, the lower end of a shock absorber 541 is joined to a lower fork assembly 518 by means of a pivot shaft 551. An extension 525c is provided for a front arm 525 so as to extend upwardly over an axle 525a joining the front arm 525 and an upper fork assembly 527. A progressive linkage 545 comprises a first link 547 and a second link 549. The first link 547 is pivotably joined at the front end thereof to the upper fork assembly 527 and is also joined at the rear end thereof to the upper end of the shock absorber 541. The second link 549 connects the extension 525c of the front arm 525 to the intermediate part of the first link 547.

With the transformation of the four-bar linkage 537, the front arm 525 is turned counterclockwise about the pivot shaft 525a so that the first link 547 is turned in a clockwise direction by the second link 549. The quantity of compression of the shock absorber 541 is progressively increased by a quantity corresponding to the rotation of the first link 547. A similar operation of the suspension to that described above may be provided by joining the upper end of the second link 549 to the rear end of the first link 547. Furthermore, a similar operation may also be provided by providing an extension for a rear arm 526 so as to extend upwardly over the junction between the rear arm 526 and the upper fork assembly 527 and connecting the extension to the first link 547 by the second link 549. In this construction, the first link need not necessarily be located above the arm 526 to be joined to the upper fork assembly, because the second link functions as a compression link to turn the first link in a counterclockwise direction similarly to the operation as described hereinabove.

All the embodiments of the suspensions according to the present invention as described hereinabove comprise the respective progressive linkages, each including a link, i.e. a link designated by a reference numeral 59, 89, 129, 227, 267, 309, 437, 477, 507 or 547, which is caused to turn according to the transformation of the corresponding four-bar linkage, and the rotation of such a link provides for a progressive damping characteristic of the shock absorbers.

We claim:

1. In a front suspension for a motorcycle, including: at least one first linkage in the form of a four-bar linkage having an upper fork assembly pivoted to a frame of said motorcycle and a lower fork assembly supporting a front wheel of said motorcycle, said upper fork assembly and said lower fork assembly being connected with each other through a front arm and a rear arm which are both pivotable; and at least one shock absorber which absorbs and damps movement of said front wheel in following road irregularities and causing a transformation of said first linkage; an improvement, comprising:

at least one second linkage interposed as a load transmitting passage between said first linkage and said shock absorber;

said second linkage having an input end pivotably connected to said first linkage and an output end pivotably connected to one end of said shock absorber; and said output end being movable by a progressive displacement additional to a displacement of said input end with respect to a first direction substantially effective for said shock absorber to absorb and damp said movement of said front wheel.

2. A front suspension according to claim 1, wherein: said second linkage comprises an input link means including said input end, an output link means including said output end and a restriction link means; said input link means having a first pivotable part located apart from said input end; said output link means having a second pivotable part located apart from said output end and connected pivotally to said input link means, and said restriction link means being pivotable at its one end and restraining at its other end through a pivotal connection said output link means from pivoting about said second pivotable part in a second direction opposite to said first direction.

3. A front suspension according to claim 1, wherein: only one said shock absorber is provided, and said shock absorber is disposed in front of the upper part of said upper fork assembly.

4. A front suspension according to claim 3, wherein: a rod is provided between said first linkage and said second linkage; the lower end of said rod is joined to an extension provided for either one of said front and rear arms, said rod extending upwardly past a junction between said upper fork assembly and said one of said arms provided with said extension; the upper end of said shock absorber is joined to said upper fork assembly; and said second linkage comprises a first link joined at the intermediate part thereof to said upper fork assembly and joined at the rear end thereof to the upper end of said rod, a second link formed in a V-shape having a front extension and an upper extension and joined at the bent part thereof to the front end of said first link, and a third link connecting the upper extension of said second link to said upper fork assembly.

5. A front suspension according to claim 3, wherein: a rod is provided between said first linkage and said second linkage; the lower end of said rod is joined to an extension provided for either one of said front and rear arms, said rod extending upwardly past a junction between said upper fork assembly and said one of said arms provided with said extension; the lower end of said shock absorber is joined to said upper fork assembly; and said second linkage comprises a first link joined at the rear end thereof to said upper fork assembly and at the intermediate part thereof to the upper end of said rod, a second link formed in a V-shape having a front extension and upper extension, joined at the bent part thereof to the front end of said first link and joined at the front extension thereof to the upper end of said shock absorber, and a third link connecting said upper extension of said second link to said upper fork assembly.

6. A front suspension according to claim 3, wherein: a rod is provided between said second linkage and said shock absorber; the lower end of said shock absorber is joined to said upper fork assembly; the upper end of said rod is joined to the upper end of said shock absorber; and said second linkage comprises a first link formed as an extension of either one of said front and rear arms and extending past the junction between said upper fork assembly and the arm provided with said extension, a second link formed in a V-shape having a front extension and a lower extension and joined at the bent part thereof to said first link and at the front extension thereof to the lower end of said rod, and a third link connecting said lower extension of said second link to said upper fork assembly.

7. A front suspension according to claim 3, wherein: a rod is provided between said second linkage and said shock absorber; the upper end of said shock absorber is joined to said upper fork assembly; the upper end of said rod is joined to the lower end of said shock absorber; and said second linkage comprises a first link formed in a V-shape having a front extension and a lower extension and joined at the bent part thereof to the lower end of said rod and at the lower extension thereof to one member among said front and rear arms and said lower fork assembly, and a second link connecting the front extension of said first link to said upper fork assembly.

8. A front suspension according to claim 3, wherein: a rod is provided between said first linkage and said second linkage; the upper end of said shock absorber is joined to said upper fork assembly; the lower end of said rod is joined to one member among said front and rear arms and said lower fork assembly; and said second linkage comprises a first link formed in a V-shape having a front extension and an upper extension and joined at the bent part thereof to the upper end of said rod and at the front extension thereof to the bottom end of said shock absorber, a second link joined at the rear end thereof to said upper fork assembly and at the front end thereof to said bent part of said first link, and a third link connecting said upper extension of said first link to said upper fork assembly.

9. A front suspension according to claim 3, wherein: a rod is provided between said first linkage and said second linkage; the upper end of said shock absorber is joined to said upper fork assembly; the lower end of said rod is joined to one member among said front and rear arms and a lower fork assembly; and said second linkage comprises a first link joined at the front end thereof to the upper end of said rod and at the rear end thereof to said upper fork assembly, a second link formed in a V-shape having a front extension and an upper extension are joined at the bent part thereof to the intermediate part of said first link and at the front extension thereof to the lower end of said shock absorber, and a third link connecting said upper extension of said second link to said upper fork assembly.

10. A front suspension according to claim 1, wherein: a pair of said first linkages and a pair of said shock absorbers are respectively provided on either lateral side of said motorcycle.

11. A front suspension according to claim 10, wherein: the upper end of each of said shock absorbers is joined to said upper fork assembly; and said second linkage comprises a first link formed in a V-shape having a front extension and an upper extension and joined at the bent part thereof to said lower fork assembly and at the front exension thereof to the bottom end of said shock absorber, and a second link connecting an extension formed on either one of said front and rear arms so as to extend downwardly below the junction between the arm provided with said extension and said lower fork assembly, to said upper extension of said first link.

12. A front suspension according to claim 10, wherein: the lower end of said shock absorber is joined to said lower fork assembly; and said second linkage comprises a first link formed in a V-shape having a rear extension and an upper extension and joined at the bent part thereof to said upper fork assembly and at the rear extension thereof to the upper end of said shock absorber, and a second link connecting the upper extension of said first link to either one of said front and rear arms.

13. A front suspension according to claim 10, wherein: the lower end of said shock absorber is joined to said lower fork assembly; either one of said front and rear arms comprises an extension bending ahead from the junction between said upper fork assembly and the arm having said extension; and said second linkage comprises a first link joined at the front end thereof to said upper fork assembly and at the rear end thereof to the upper end of said shock absorber, and a second link connecting said first link to said extension provided for said one of said arms.

14. A front suspension according to claim 10, wherein: the lower end of said shock absorber is joined to said lower fork assembly; either one of said front and rear arms is provided with an extension extending upwardly past the junction between said upper fork assembly and the arm having said extension; and said second linkage comprises a first link joined at the front end thereof to said upper fork assembly and at the rear end thereof to the upper end of said shock absorber, and a second link connecting said first link to said extension provided for said one of said arms.

* * * * *